United States Patent [19]

Rosenquist

[11] Patent Number: 4,857,627
[45] Date of Patent: Aug. 15, 1989

[54] AMINO PHENOL END CAPPED AROMATIC POLYCARBONATE REACTED WITH SULFONATE

[75] Inventor: Niles R. Rosenquist, Evansville, Ind.

[73] Assignee: General Electric Company, Mt. Vernon, Ind.

[21] Appl. No.: 662,695

[22] Filed: Oct. 19, 1984

[51] Int. Cl.$^4$ ............................................. C08G 63/62
[52] U.S. Cl. .................................. 528/199; 525/463; 525/467; 528/198
[58] Field of Search ................ 528/199; 525/463, 467

[56] References Cited

U.S. PATENT DOCUMENTS 3,085,992 4/1963 Lee et al. ............................. 528/199
3,227,681 1/1966 Conix ................................... 528/199

Primary Examiner—Harold D. Anderson
Attorney, Agent, or Firm—Martin Barancik

[57] ABSTRACT

A composition comprising an aromatic carbonate polymer end-capped with a group of the structure

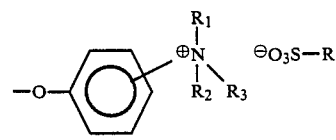

wherein $-{}^+NR_1R_2R_3$ is meta or para to the O and $R_1$, $R_2$ and $R_3$ are the same or different and are alkyl of one to three carbon atoms; R is alkyl of one to six carbon atoms, perfluoroalkyl of one to eight carbon atoms, inclusive, phenyl or phenyl substituted with one to three substituents. These substituents can be any of the ordinary substituents which are essentially inert to reaction conditions, such as alkyl, cycloalkyl, alkoxy, phenyl, halo, trifluoromethyl and the like. The alkyl or alkyl group of the alkoxy is generally from one to six carbon atoms, inclusive, branched or normal. Generally, electronegative groups such as fluoro, chloro, bromo and trifluoromethyl are preferred.

4 Claims, No Drawings

AMINO PHENOL END CAPPED AROMATIC POLYCARBONATE REACTED WITH SULFONATE

BACKGROUND OF THE INVENTION

Aromatic carbonate polymers have been end-capped with a variety of end-capping reagents. The most commonly employed family of compounds is the monophenols. The physical characteristics of aromatic carbonate polymers end-capped with the family of phenols are well known. Once the end-capper has been placed in the resin, generally no further chemistry occurs with the end-capping agent.

It has now been found that by using a specifically substituted phenol, further chemistry can be attained. This chemistry succeeds in placing a quaternary ammonium group on the end of the resin chain.

SUMMARY OF THE INVENTION

In accordance with the invention there is a composition comprising an aromatic carbonate polymer at least partially end-capped with a group of the following structure

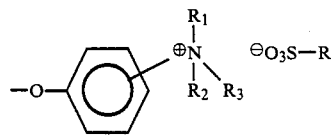

FIG. 1 wherein $-{}^+NR_1R_2R_3$ are meta or para to the O and $R_1$, $R_2$ and $R_3$ are the same or different and are alkyl of one to three carbon atoms; R is alkyl of one to six carbon atoms, perfluoroalkyl of one to eight carbon atoms, inclusive, phenyl or phenyl substituted with one to three substituents. These substituents can be any of the ordinary substituents which are essentially inert to reaction conditions, such as alkyl, cycloalkyl, alkoxy, phenyl, halo, trifluoromethyl and the like. The alkyl or alkyl group of the alkoxy is generally from one to six carbon atoms, inclusive, branched or normal. Cycloalkyl of four to eight carbon atoms, inclusive, are also included. Generally, electronegative groups such as fluoro, chloro, bromo and trifluoromethyl are preferred.

The polymer is prepared under standard processing conditions, for example interfacial polymerization wherein a compound of the structure

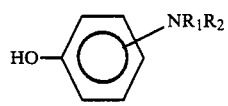

FIG. 2 wherein $R_1$ and $R_2$ are previously defined is employed as the end-capping agent. After the end-capped aromatic carbonate polymer has been prepared, the polymer end-capping group is reacted with a compound of the formula

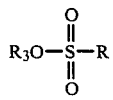

FIG. 3 wherein $R_3$ and R are as previously defined and thereby provide an aromatic carbonate polymer end-capped with the structure of FIG. 1.

DETAILED DESCRIPTION OF THE INVENTION

The aromatic carbonate polymer end-capped and prepared in this invention is the usual type prepared from a dihydric phenol and carbonate precursor.

Aromatic polycarbonates are prepared in the conventional manner by reacting a dihydric phenol with a carbonate precursor in an interfacial polymerization process. Typical of some of the dihydric phenols that may be employed in the practice of this invention are 2,2-bis(4-hydroxyphenyl)propane (bisphenol-A);
2,2-bis(4-hydroxy-3-methylphenyl)propane;
4,4-bis(4-hydroxyphenyl)heptane;
2,2-(3,5,3',5'-tetrachloro-4,4'-dihydroxydiphenyl) propane;
2,2-(3,5,3',5'-tetrabromo-4,4'-dihydroxydiphenyl) propane;
(3,3'-dichloro-4,4'-dihydroxyphenyl)methane;
bis 4-hydroxy phenyl sulfone;
bis 4-hydroxy phenyl sulfide.

Other dihydric phenols of the bisphenol type are also available and are disclosed in U.S. Pat. Nos. 2,999,835; 3,028,365 and 3,334,154. Bisphenol-A is preferred.

It is, of course, possible to employ two or more different dihydric phenols or a copolymer of a dihydric phenol with a glycol or with hydroxy or acid terminated polyester, or with a dibasic acid in the event a carbonate copolymer or interpolymer rather than a homopolymer is desired for use in the preparation of the aromatic carbonate polymers of this invention. Also employed in the practice of this invention may be blends of any of the above materials to provide the aromatic carbonate polymer.

The carbonate precursor may be either a carbonyl halide or a haloformate. The carbonyl halides which can be employed herein are carbonyl bromide, carbonyl chloride and mixtures thereof. The haloformates suitable for use herein include bis-haloformates of dihydric phenol (bis-chloroformates of hydroquinone, bisphenol-A, and the like), or glycols (bishaloformates of ethylene glycol, neopentyl glycol, polyethylene glycol, etc.). While other carbonate precursors will occur to those skilled in the art, carbonyl chloride, also known as phosgene, is preferred.

A suitable acid acceptor is generally an inorganic base. The inorganic acid acceptor may be one which can be either a hydroxide, a carbonate, a bi-carbonate, or a phosphate of an alkali or alkaline earth metal.

The catalysts which are employed herein can be any of the suitable catalysts that aid the polymerization of bisphenol-A with phosgene. Suitable catalysts include tertiary amines such as, for example, triethylamine, tripropylamine, N,N-dimethylaniline, quaternary ammonium compounds such as, for example, tetraethylammonium bromide, cetyl triethyl ammonium bromide, tetra-n-heptyl-ammonium iodide, tetra-n-propyl ammonium bromide, tetramethylammonium chloride, tetra methyl ammonium hydroxide, tetra-n-butylammonium iodide, benzyltrimethylammonium chloride and quaternary phosphonium compounds such as, for example, n-butyltriphenyl phosphonium bromide and methyltriphenyl phosphonium bromide.

Also included herein are branched polymers wherein a polyfunctional aromatic compound is reacted with the dihydric phenol and carbonate precursor to provide a thermoplastic randomly branched polccarbonate polymer.

These polyfunctional aromatic compounds contain at least three functional groups which are carboxyl, carboxylic anhydride, haloformyl or mixtures thereof. Examples of these poly-functional aromatic compounds which may be employed in the practice of this invention include: trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenonetetracarboxylic acid, benzophenonetetracarboxylic anhydride and the like. The preferred polyfunctional aromatic compounds are trimellitic anhydride or trimellitic acid, or their haloformyl derivatives.

Also, included herein are blends of a linear polymer and a branched polymer. It should be noted that such branched polycarbonates have inherent non-Newtonian viscosity characteristics.

The end group aminophenol is used in the same manner, concentration and process conditions as any phenol. The reaction of the end-capped polymer with the sulfonyl substituted group occurs in a solvent such as chloroform, methylene chloride and the like at a temperature of from about 70° to about 85° for a period of at least several hours. The reaction can go as long as several days. It should also be noted that other end-capping agent residues may be on the aromatic carbonate polymer at the same time, that is the polymer may only be partially end-capped with agents of this application, the remainder of the end-cap may be standard agents such as residues of phenol or p-tert. butylphenol.

Polymers prepared in this manner will exhibit the property enhancements characteristically observed from ionomer resins, i.e. resins with ionic functional group covalently bound to them, including ionic cross-linking and enhanced non-Newtonian rheology characteristics.

Below are specific examples of the invention. These examples are not intended to limit but merely to exemplify the invention.

EXAMPLE 1

Preparation of 3-(dimethylamino)phenol end-capped polycarbonate resin.

A 1000 ml four neck flask was fitted with a mechanical stirrer, a pH probe, aqueous caustic inlet tube and a Claisen adaptor to which was attached a dry ice condenser and a gas inlet tube. To the flask was added 280 ml water, 350 ml methylene chloride, 1.4 ml triethyl amine (0.01 mole), 57 g (0.25 mole) bisphenol-A and 1.29 g (0.0094 mole, 3.76 mole%) of 3-(dimethylamino)phenol.

With stirring the pH was raised to 8.5 by addition of 25 wt. % aqueous sodium hydroxide, then phosgene was introduced into the flask at 1.0 g/min. for 30 minutes (0.3 mole) with pH maintained at 8.5 to 9.5. The resin layer was separated from the brine layer, then washed twice with 3 wt. % aqueous HCl, then twice with distilled water. The resin was then precipitated into 1500 ml of methanol in a Waring blender, then washed with 500 ml more methanol. The resin had intrinsic viscosity in methylene chloride at 25° C. of 0.442° C.

EXAMPLE 2

The procedure of Example 1 was used except using 6.86 g (0.05 mole, 20 mole %) of 3-(dimethylamino) phenol. The resin had intrinsic viscosity of 0.184.

EXAMPLE 3

Preparation of polycarbonate resin with trimethylammonium end groups by reacting the resin of Example 2 with methyl-p-toluenesulfonate.

In 1.0 ml of chloroform-d was dissolved 0.35 g (0.00025 chemical equivalents of amine end groups) of the resin of Example 2 and 0.093 g (0.0005 mole) of methyl-p-toluenesulfonate. A portion of the sample was placed in an nmr tube and the spectrum determined. With the cap sealed in place, the tube was then heated to 75° to 82° C. for a total of four days, with the progress of the reaction converting the dimethylamine end groups to trimethyl ammonium groups monitored by integration of the nmr signals of the methyl groups present. Results are given in the Table. The data there indicates approximately 80% reaction after 2 days reaction and >90% reaction after four days.

TABLE

| METHYL GROUP | CHEMICAL SHIFT ($\gamma$) | RELATIVE INTEGRATION | | | | |
|---|---|---|---|---|---|---|
| | | 0 hr | 24 hr | 48 hr | 72 hr | 96 hr |
| $(CH_3)_2C-$ | 1.68 | 1.0 | 1.0 | 1.0 | 1.0 | 1.0 |
| $CH_3-$aryl of p-toluene sulfonate anion | 2.24 | 0.0 | 0.052 | 0.078 | 0.082 | 0.104 |
| $CH_3-$aryl of methyl-p-toluene sulfonate | 2.39 | 0.21 | 0.15 | 0.16 | 0.15 | 0.126 |
| $(CH_3)_2N-$ | 2.92 | 0.19 | 0.095 | 0.034 | 0.023 | 0.013 |
| $CH_3O-$ of methyl-p-toluene sulfonate | 3.66 | 0.21 | 0.15 | 0.13 | 0.12 | —* |
| $(CH_3)_3N+-$ | 3.70 | 0.0 | 0.18 | 0.22 | 0.25 | —* |

*Overlap of peaks prevented accurate integration.

What is claimed is:
1. A composition comprising an aromatic carbonate polymer at least partially end-capped with a group of the structure

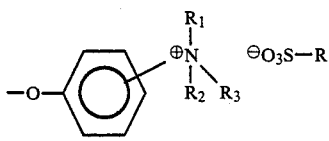

wherein +-NR₁R₂R₃ is meta or para to the 0 and $R_1$, $R_2$ and $R_3$ are the same or different and are alkyl of one to three carbon atoms; R is alkyl of one to six carbon atoms, perfluoroalkyl of one to eight carbon atoms, inclusive, phenyl or phenyl substituted with one to three substituents.

2. The composition in accordance with claim 1 wherein each of $R_1$, $R_2$, and $R_3$ are methyl.

3. The composition in accordance with claim 1 wherein R is p-tolyl.

4. The composition in accordance with claim 2 wherein R is p-tolyl.

* * * * *

UNITED STATES PATENT AND TRADEMARK OFFICE
CERTIFICATE OF CORRECTION

PATENT NO. : 4,857,627

DATED : August 15, 1989

INVENTOR(S) : Niles Richard Rosenquist

It is certified that error appears in the above-identified patent and that said Letters Patent is hereby corrected as shown below:

Column 3, line 2, "polccarbonate" should read --polycarbonate--.

Column 4, line 15, delete "°c"

Signed and Sealed this

Third Day of July, 1990

Attest:

HARRY F. MANBECK, JR.

Attesting Officer

Commissioner of Patents and Trademarks